D. W. ADAMS.
MULTIMETER SURVEYING INSTRUMENT.
APPLICATION FILED FEB. 6, 1911.
1,003,857.
Patented Sept. 19, 1911.
2 SHEETS—SHEET 2.
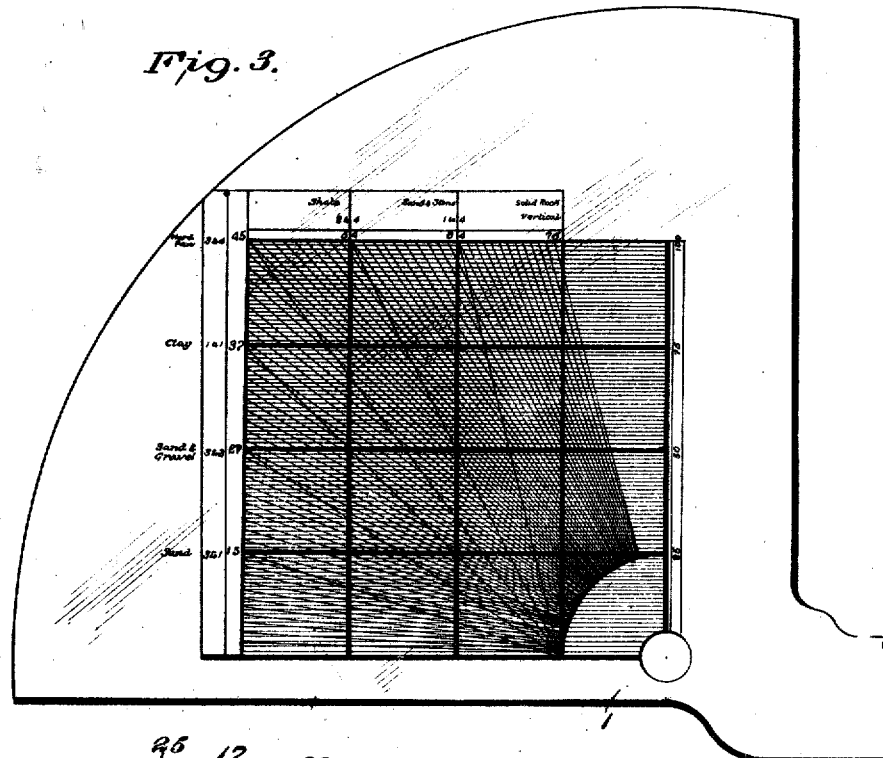
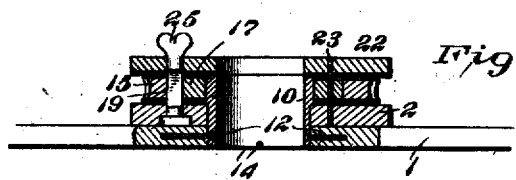
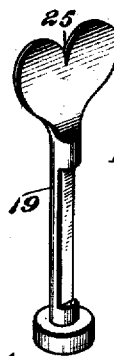
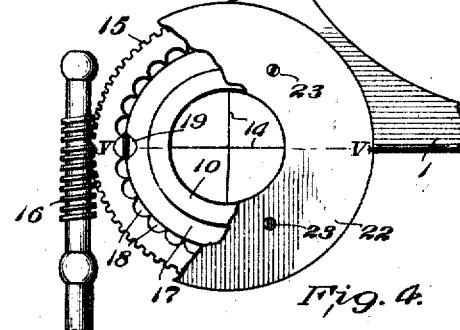
Witnesses
J. Adolph Bishop
James Fitz Gibbon
Inventor
Daniel W. Adams,
By Eugene C. Brown
Attorney

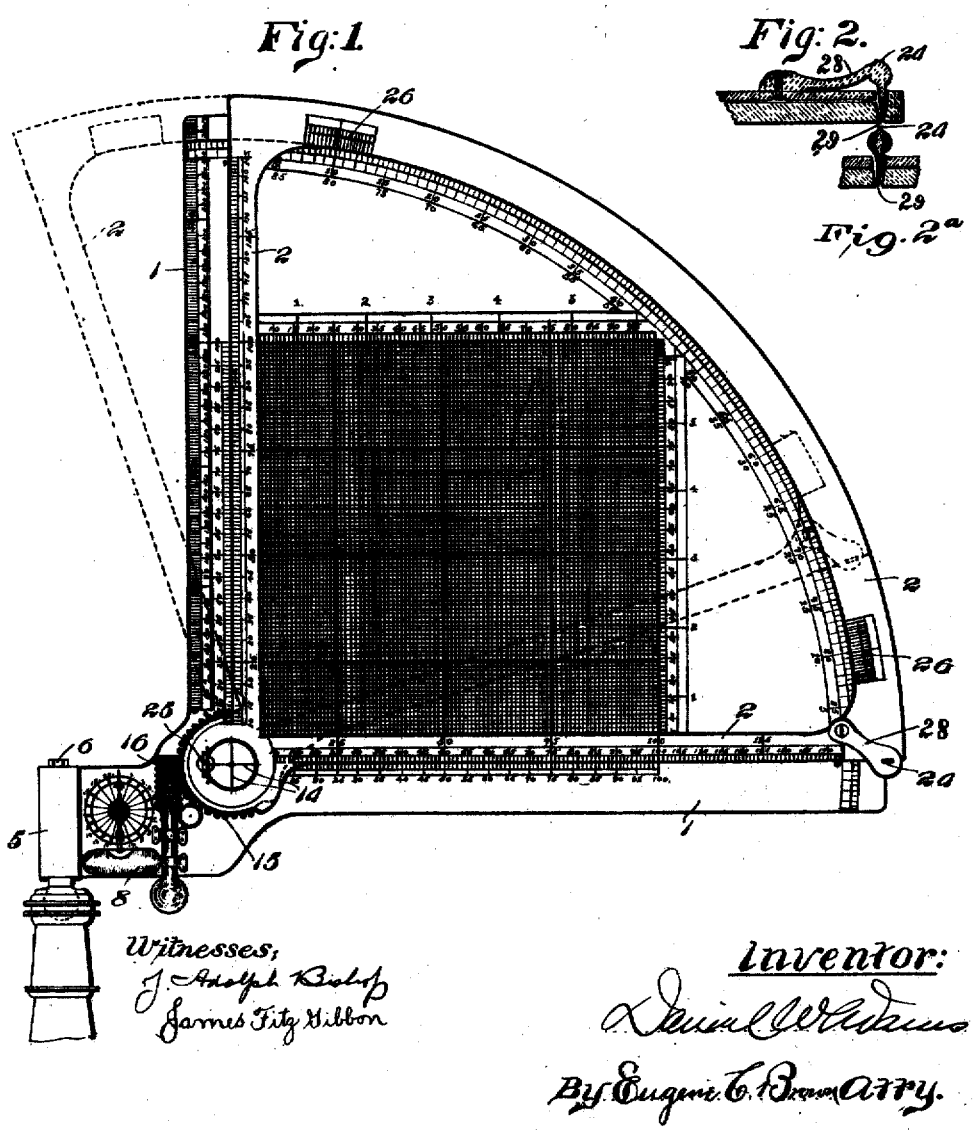

UNITED STATES PATENT OFFICE.

DANIEL W. ADAMS, OF GLENDALE SPRINGS, NORTH CAROLINA.

MULTIMETER SURVEYING INSTRUMENT 1,003,857. Specification of Letters Patent. Patented Sept. 19, 1911.

Application filed February 6, 1911. Serial No. 606,873.

*To all whom it may concern:*

Be it known that I, DANIEL W. ADAMS, a citizen of the United States, residing at Glendale Springs, in the county of Ashe and State of North Carolina, have invented new and useful Improvements in Multimeter Surveying Instruments, of which the following is a specification.

My invention relates to an instrument for the use of surveyors and engineers.

The object of my invention is to provide an instrument which will greatly facilitate the work of reconnaissance engineers and surveyors in running grade lines of elevation or depression, or on the level, as in the preliminary location of trails, roads, and railroads. The instrument is especially valuable in setting slope or grade stakes, eliminating the usual difficult calculations necessary to determine the exact location of the stakes. It will be evident to engineers that my invention may be used for many other purposes, for instance, as a hypsometer to determine the height of trees, or as a plotting instrument. These and other uses will be understood from the following description in connection with the accompanying drawings, in which—

Figure 1 is a front elevation of an instrument embodying my invention; Figs. 2 and 2ª are enlarged detail views of the combined front sight and marking device; Fig. 3 is a rear elevation of the base plate; Fig. 4 is an enlarged detail view, partly in section, of the slow motion gear and clutch mechanism for operating the quadrant arms; Fig. 5 is a cross-section on the line V—V of Fig. 4, with the worm omitted; and Fig. 6 is an enlarged perspective of the combined rear sight and locking bar.

The instrument comprises two principal parts, the limb or plate 1, and the quadrant arm 2, the latter being swiveled on the hub 10 to move thereover, and may be radiated over three-fourths of a circle. For the purpose of making the instrument very light, I preferably construct the base plate of aluminum, and for convenience of contrast I make the quadrant arm of brass or other material. The base is provided with a sleeve or cuff 5, adapted to be mounted upon the stem or pivot stem 6 of a Jacob's staff or tripod, and may be brought to the proper position by observing the level 8.

The pivotal connection of the quadrant arm and the slow motion gear and clutch mechanism are illustrated in detail in Figs. 4 and 5. The tubular hub 10, upon which the arm 2 is swiveled, and in the bottom of which the cross-hairs 14 are mounted, is secured to the base plate by means of screws 12. The gear 15, in mesh with the operating worm 16, surrounds the collar 17 and is provided in its inner periphery with a series of indentations or recesses 18, into any one of which the mutilated bar 19 may be turned to lock the gear and collar together. When the locking bar 19 is turned with its flattened side toward the recesses, the gear is disengaged from the collar as the stem of the bar then rests in a recess in the collar 17 in line with the horizontal cross-hair. The top or cover plate 22, and the collar 17 are secured to the quadrant arm 2, by means of screws 23. The top of the locking bar constitutes a thumb-piece and is shaped to form a sight 25, which is used as the rear sight of the instrument. It will be evident that when the locking bar 19 is turned with the flattened side outward, the quadrant arm may be freely swung about the hub 10, and when the bar is reversed the gear and collar will be locked so that the arm may be moved slowly by turning the worm 16.

Referring to Fig. 1, showing the diagram upon the front of the instrument, it will be observed that the periphery of the base or limb is provided with a scale, graduated into degrees from 1 to 90, and by means of the verniers 26, at each end of the arm, this may be read to single minutes. Inscribed within the quadrant upon the face of the plate or limb is a quadrangular diagram divided primarily into sixteen squares, each of which is subdivided into six hundred and twenty-five equal spaces. The sides of the diagram are provided with scales divided into one hundred parts. The arms of the swinging quadrant are provided with corresponding graduations extending throughout their length. The upper and right-hand sides of the diagram are also divided into six equal divisions. I also graduate the outer vertical edge of the limb with a scale divided into divisions of forty to the inch. Upon the reverse face of the base plate or limb, as shown in Fig. 3, I provide a similar diagram, also divided into sixteen squares, but subdivided in a different manner from that previously described. The diagram is divided vertically by one hundred equally spaced horizontal lines, numbered upon the right-hand margin of the diagram. A series of radial lines, centering at the intersection of the cross-hairs, extend across the diagram and are numbered upon the left-hand and upper margins to correspond with the degrees upon the periphery of the limb. I also provide a series of lines radiating from the intersection of the base and first vertical line to the left of the cross-hairs, this point corresponding with the twenty-fifth graduation upon the scale of one hundred. The last mentioned radiating lines extend to the intersection of the principal horizontal and vertical division lines with the marginal lines. In the drawing, only a few of the marginal graduation numbers are indicated, the intervening numbers being omitted for purposes of clearness in illustration.

A few illustrations will serve to indicate the manner of using this instrument, which will be understood by surveyors, engineers, and those familiar with surveying instruments.

To use the instrument for leveling and grading:—To run a level line, the instrument is mounted upon a Jacob's staff, in the manner shown in Fig. 1, and the base of the limb is swung into the direction of the projected line and is brought to a level position as indicated by the central position of the bubble in the level 8. The quadrant arm is then rotated by means of the slow motion screw 16, until the front sight 24 and rear sight 25 are in alinement with the horizontal line of graduations on the limb, in other words, in the zero position. Then by sighting across the sights to the target, the level line can be secured. If a grade line requiring an angle of elevation or depression is necessary, it is obvious that it may be projected in a similar manner, either by percentage directly from the vertical or the horizontal scale, or by degrees from the graduations on the limb or plate.

To use the instrument as a hypsometer to determine the height of trees or other objects, a distance of 100 feet from the object is first measured off and the instrument is set up and leveled in the manner previously described. The arm is then swung around, as indicated in dotted lines, until the top of the tree or object is in alinement with the sights. The height in feet may be read directly at the intersection of the lower arm with the right hand vertical graduations upon the margin of the diagram. In the position indicated, a height of 32 feet is indicated, or two standard 16 foot logs, in the outer column of figures. The portion of the tree below the level line can be ascertained by depressing the arm until the sights intercept the bottom of the same, and the amount can be read from the upper marginal scale at the intersection of the upper arm. It will be observed that, in the illustration given, the arm was raised to an angle of about 18°, and that at this angle the height indicated on the vertical scale is 32 feet, thus at this angle the vertical height is 32 per cent. of the length of the base line. The per cent., therefore, may be converted into degrees of angle or vice versa, and this may be obtained for any angle by rotating the arm to the desired reading.

Stadia corrections may be easily made by means of this instrument. When a stadia rod is held at right angles to the line of sight, the proper stadia reduction can be obtained by scaling the reading on the graduations on the arm and following the intersecting vertical line to the graduations on the horizontal base, and reading it directly from the same. This is a very valuable feature, since any value can be given to divisions on the diaphragm, thus obviating the necessity of a surveyor carrying a book on stadia corrections, which also entails an additional calculation for each reading.

The setting of grade or slope stakes by means of my instrument is a very simple operation, and can be accomplished with great accuracy. For this purpose, I employ the diagram engraved upon the reverse face of the plate, as illustrated in Fig. 3, in connection with the movable arm. The diagram is graduated upon the assumption that the bottom of the cut or roadbed is the usual standard width of 50 feet. If, for instance, it is desired to know the distance from the center grade stake to the upper grade stake on a side hill cut which has an angle of 34° and a slope of 1 to 1 is desired, the instrument is set up and leveled over the center grade stake and the arm is set at 34°. It will be observed that the intersection of the 34° line with the line indicating a 1 to 1 slope is at the horizontal graduation 50. Following corresponding horizontal line 50 on the other face of the plate to the intersection of the movable arm, which is now set at 34°, one reads 89½ on the arm, which indicates the number of feet from the center grade stake or hub to the upper slope stake. It is obvious that any hill angle from 1° to 77° and any slope from 3 to 1, to the vertical may be obtained in like manner. This use of the instrument is exceedingly important, and effects a very great saving of time and labor in determining the locations for setting the stakes.

This instrument may also be used in the office to facilitate computations and the solution of problems arising in engineering. By referring to the diagram in Fig. 1, it will be apparent that the 16 squares may represent a section of land divided into 40's, or a 40 of land divided into 2½ acre plats, or it may be given any other value, such as a portion of a township plat, in which case the primary divisions would be 640 acres each. In order to determine latitudes and departures, it is only necessary to rotate the graduated arm over the field corresponding to the magnetic bearing of the survey, in degrees, measure off the distance along the arm corresponding to the distance measured in the survey and note the intersecting lines on the diagram; following the horizontal line to the marginal graduation the northing may be read, and following the vertical line to the marginal graduation the easting may be read. It is apparent that by giving the instrument the different imaginary orientations, the four quadrants can thus be covered, thereby securing the various readings necessary to obtain the correct latitude or departure from one or any number of readings.

The value of any angle may be obtained. In mechanical drafting or laying out work, any value may be given to the divisions of the diagram from fractions of an inch to hundreds of feet. For instance, if a slope of 2 to 4 is desired, it is apparent that by rotating the arm to the intersection on the diagram at 50 on the vertical scale, the correct reading in degrees and minutes can be obtained in the graduations on the plate. This is especially valuable to engineers, architects, carpenters, and other mechanics.

It is obvious that the third side of any right angle triangle can be obtained when the other two are given. Also that the natural tangent of any angle up to 100 units and 45° is obtained.

Above the level on the plate, I have provided a tally register for keeping tally of "outs". The dial is graduated from 1 to 20, and is provided with a depression at each figure into which the pointer or needle may be sprung, and its elasticity holds it in place until it is again turned.

This instrument constitutes a very efficient and convenient protractor. The plate may be oriented on the drawing paper with the cross-hairs 14 on the turning point. The arm 2 may then be rotated to any point on three-quarters of a circle. When the desired reading is obtained on the arm, the point may be registered upon the paper by pressing down upon the spring arm 28 and causing the point of the perforator 29, shown in detail in Fig. 2, to prick or indent the paper. This feature will be found to facilitate the work and to secure accuracy. I sometimes find it advantageous to provide a magnifying glass over the cross-hairs.

While I have mentioned a number of uses to which the instrument may be applied, in field work or surveying and also in desk or office work, yet it will be evident to engineers that it may be used in many other ways.

Probably the most important feature of this instrument to reconnaissance men and topographical surveyors is the ease and accuracy with which relative elevations can be ascertained in the field, thus eliminating the error caused by the diurnal variation of barometric pressure. A reading can be taken from any section corner or other known point of the resurvey on a peak, the elevation of which has been accurately fixed by a Y-level geographical survey and the difference in elevation read directly from the multimeter, mathematically and mechanically correct. This gives to the unskilled surveyor all the advantages of precise vertical control, which is at present only possible under the methods of the precise vertical control. It is obvious that this instrument will also greatly facilitate and cheapen the cost of the present method of vertical control.

I am aware that changes may be made in the structure of the instrument without departing from the spirit of my invention, and intend, therefore, to cover such changes in the scope of my claims.

Having now described my invention and the method of using the same, I claim:-

1. A surveying instrument comprising a quadrantal base plate or limb having graduations upon each side, a rectangular diagram inscribed upon the plate within the lines of said graduations and divided into a number of rectangular subdivisions, means secured to said plate for attachment to a tripod or staff, a level mounted upon said plate parallel with one edge thereof, an arm pivotally mounted upon said plate and having rectangular and arcuate portions adapted to overlie the corresponding portions of the plate when in normal or zero position, and sights secured to the forward and rear ends of one side of the rectangular portion of the arm.

2. A surveying instrument comprising a quadrantal base plate or limb having graduations upon each side, a rectangular diagram inscribed upon the plate within the lines of said graduations and divided into a number of rectangular subdivisions, means secured to said plate for attachment to a tripod or staff, a level mounted upon said plate parallel with one edge thereof, an arm pivotally mounted upon said plate and having rectangular and arcuate portions adapted to overlie the corresponding portions of the plate when in normal or zero position, sights secured to the forward and rear ends of one side of the rectangular portion of the arm, slow-motion gear mechanism adapted to rotate said arm, and means for connecting or disconnecting said mechanism with the arm.

3. A surveying instrument comprising a quadrantal base plate or limb having graduations upon each side, a rectangular diagram inscribed upon the plate within the lines of said graduations and divided into a number of main rectangular subdivisions, each of said subdivisions being further divided into an equal number of rectangular parts, marginal graduations upon the two outer sides of the diagram adjacent the arcuate side of the plate corresponding with the graduations on the rectangular sides thereof, and a quadrantal skeleton arm pivotally mounted upon said plate having graduations upon the rectangular edges corresponding with and adapted to register with the graduations upon the sides of the plate when the arm is in zero position.

4. A surveying instrument comprising a quadrantal base plate or limb having graduations upon each side, a rectangular diagram inscribed upon the plate within the lines of said graduations and divided into a number of main rectangular subdivisions, each of said subdivisions being further divided into an equal number of rectangular parts, radial lines crossing said diagram which when projected would correspond with the graduations upon the arcuate portion of the plate, and a quadrantal skeleton arm pivotally mounted upon said plate having rectangular and arcuate portions adapted to aline with the corresponding portions of the plate when the arm is in zero position.

5. A surveying instrument comprising a quadrantal base plate or limb having graduations upon each side, a rectangular diagram inscribed upon the plate within the lines of said graduations and divided into a number of main rectangular subdivisions, each of said subdivisions being further divided into an equal number of rectangular parts, radial lines crossing said diagram which when projected would correspond with the graduations upon the arcuate portion of the plate, diagonal lines connecting the upper and outer side marginal intersections of the main division lines with one of the lower marginal intersections of the main division lines, and a quadrantal skeleton arm pivotally mounted upon said plate having rectangular and arcuate portions adapted to aline with the corresponding portions of the plate when the arm is in zero position.

6. A surveying instrument comprising a quadrantal base plate or limb having graduations upon each side, a rectangular diagram inscribed upon the plate within the lines of said graduations and divided into a number of main rectangular subdivisions, each of said subdivisions being further divided into an equal number of rectangular parts, marginal graduations upon the two outer sides of the diagram adjacent the arcuate side of the plate corresponding with the graduations on the rectangular sides thereof, a second rectangular diagram upon the opposite face of the plate equal in size and occupying the same relative position as the first-named diagram and being likewise divided into an equal number of main rectangular subdivisions each of which is further divided into an equal number of parts, and a quadrantal skeleton arm pivotally mounted upon said plate graduated upon the rectangular edges to correspond with and adapted to register with the graduations upon the sides of the plate when the arm is in zero position.

7. An instrument of the character described, comprising a quadrantal base plate or limb, having graduations upon its sides, a square diagram inscribed upon the plate within the lines of said graduations and divided into a number of square subdivisions, marginal graduations upon the two outer sides of the diagram adjacent the arcuate side of the plate corresponding with the graduations upon the rectangular sides thereof, a quadrantal skeleton arm pivotally mounted upon said plate having graduations corresponding with the graduations upon the sides of the plate, and a needle arm secured to the outer edge of the arm, having a projecting point which may be moved over the edge of the plate.

8. An instrument of the character described, comprising a quadrantal base plate or limb, having side and arcuate graduations, a quadrantal skeleton arm pivotally mounted upon said plate to swing thereover, and having its sides graduated to correspond with the graduations on the plate, and a needle arm secured to the outer edge of the skeleton arm, having a projecting point which may be moved over the edge of the plate.

In testimony whereof I have hereunto set my hand in presence of two subscribing witnesses.

DANIEL W. ADAMS.

Witnesses:
JESSIE R. RUST,
A. B. WERTZ.